Patented Dec. 2, 1941

2,264,402

UNITED STATES PATENT OFFICE 2,264,402

PROCESS FOR REMOVING SALTS FROM WATER

Karl Pattock, Wolfen, Kreis Bitterfeld, Germany, assignor to I. G. Farbenindustrie Aktiengesellschaft, Frankfort-on-the-Main, Germany No Drawing. Application November 23, 1937, Serial No. 176,059. In Germany November 24, 1936

2 Claims. (Cl. 210—24)

The present invention relates to an improvement in a process for removing salts from water and more particularly to a process for regenerating anion-exchange filters used in such a process.

A known process for removing salts from water consists in filtering the water through two exchange filters arranged in series, the first being charged with a hydrogen exchanger and the second with a hydroxyl exchanger. For regenerating the hydrogen exchanger dilute mineral acid is used, while for regenerating the hydroxyl exchanger a liquid of alkaline reaction, especially an alkali lye, is used. Obviously, both filters may be washed with water from which the salts have been removed, but in this way a not inconsiderable portion of the purified water is withdrawn from its intended purpose. It is, therefore, preferable to wash the hydrogen exchanger with the impure water, as it is known from the regeneration of normal salt exchangers. The subsequent hydroxyl exchanger, however, cannot be washed with the impure water, since the free alkali retained by the exchanger would form with the substances imparting hardness to the impure water an insoluble precipitate which would choke the exchanger.

The present invention is based on the observation that there may be used with success for washing the hydroxyl exchanger regenerated by an alkaline medium, that portion of the filtrate from the cation filter which leaves the latter towards the end of the period of flow. At this period the sodium which was at first simultaneously exchanged with the calcium of the impure water is displaced from the exchanger by further exchanged calcium. The content of sodium in the filtrate, therefore, gradually rises and in some cases attains a value which exceeds that in the impure water. This portion of the filtrate cannot be completely freed from salt, since removal of the anions in the subsequent hydroxyl exchanger only proceeds so far as these are present in the form of their free acids. In the foregoing manner this portion of the filtrate which is not suitable for producing water free from salts may be put to useful service.

The following is an example of the invention:

Through two filters in series each charged with 100 parts by volume of a hydrogen exchanger and a hydroxyl exchanger respectively there is filtered an impure water of the following composition:

|  | mgms. per liter |
| --- | --- |
| Permanent hardness | 343.5 |
| Temporary hardness | 35.6 |
| Total hardness | 379.1 |
| Corresponding CaO | 200 |
| Na$_2$O | 61 |
| SO$_3$ | 290 |
| Cl | 57 |

The filtrate from the hydrogen exchanger contains 0.6 mgm. per liter CaO and 6.2 mgms. per liter Na$_2$O. After passage of 6200 parts by volume of the water, the sodium content in the filter suddenly begins to rise, at the same time the acid titer falls from 8 cc. of n/10 caustic soda lye per liter to 3.5 cc. The calcium content remains at first at the same value and increases only after the passage of a further 4800 parts by volume of the water.

The subsequent anion filter begins to fail in its function of removing salts after the passage of the aforesaid 6200 volumes of the preliminary purified water. The residual content of chloride first rises from less than 5 mgms. per liter to 10 to 20 mgms. per liter and by further passage of water the sulfate also enters the filtrate.

For regenerating the exchanger 250 parts by volume of caustic soda lye of 2.5 per cent. strength are used. It is then washed with 1500 parts by volume of the aforesaid fraction containing sodium of the filtrate from the cation filter, whereupon the anion filter is again ready for work.

At the end of the regeneration and the washing of the anion filter the preceding cation exchanger is regenerated and indeed as soon as it has yielded the quantity of water required for washing the anion filter.

Hydrogen ion exchangers used in such processes consist of phenol aldehyde resins, coal activated with an acid or the like. Suitable hydroxyl ion exchangers consist of amine aldehyde resins, metal oxide gels or the like.

What I claim is:

1. In a process for removing alkali metal and alkaline-earth metal salts from water by filtering it through a hydrogen ion exchanger and a hydroxyl ion exchanger arranged in series and regenerating the filters, the step which comprises washing out the alkaline regenerating liquid from the hydroxyl ion exchanger with a portion of the filtrate from the hydrogen ion exchanger which is free from alkaline earth metal ions but which contains alkali metal ions, said filtrate being obtained by continuing the filtration through the hydrogen ion exchanger after the same becomes incapable of exchanging hydrogen for the cations in the water.

2. In a process for removing alkali metal and alkaline earth metal salts from water by filtering it through a hydrogen ion exchanger and a hydroxyl ion exchanger arranged in series and regenerating the filters, the step which comprises continuing the filtration through the hydrogen ion exchanger when the content of alkali metal ions in the filtrate increases, and washing the alkaline regeneration liquid from the hydroxyl ion exchanger with the portion of the filtrate from the hydrogen ion exchanger which contains the increased concentration of alkali metal ions.

KARL PATTOCK.